(12) United States Patent
Johnson et al.

(10) Patent No.: US 11,677,643 B2
(45) Date of Patent: Jun. 13, 2023

(54) TRAFFIC CLASSIFICATION OF ELEPHANT AND MICE DATA FLOWS IN MANAGING DATA NETWORKS

(71) Applicant: AT&T Intellectual Property I, L.P., Atlanta, GA (US)

(72) Inventors: Carolyn Roche Johnson, Holmdel, NJ (US); Swapna Buccapatnam Tirumala, Holmdel, NJ (US); Fei Wu, Jersey City, NJ (US); Kartik Pandit, Aberdeen, NJ (US); Kathleen Meier-Hellstern, Cranbury, NJ (US); Brian Freeman, Farmingdale, NJ (US); Richard Koch, Tinton Falls, NJ (US); Tuan Duong, Eatontown, NJ (US); Mark Lyn, Tampa, FL (US); Steven Monetti, Mountain Lakes, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/102,093

(22) Filed: Nov. 23, 2020

(65) Prior Publication Data
US 2022/0166691 A1    May 26, 2022

(51) Int. Cl.
*H04L 43/024*    (2022.01)
*H04L 43/026*    (2022.01)
(Continued)

(52) U.S. Cl.
CPC .......... *H04L 43/024* (2013.01); *H04L 43/026* (2013.01); *H04L 43/062* (2013.01); *H04L 43/0894* (2013.01); *H04L 47/2441* (2013.01)

(58) Field of Classification Search
CPC . H04L 43/024; H04L 43/062; H04L 43/0894; H04L 47/2441; H04L 12/26; H04L 12/851
(Continued)

(56) References Cited

U.S. PATENT DOCUMENTS

| 2007/0064715 A1* | 3/2007 | Lloyd | H04L 43/0864 |
| | | | 370/401 |
| 2010/0091659 A1* | 4/2010 | O'Hanlon | H03M 13/09 |
| | | | 370/241 |

(Continued)

FOREIGN PATENT DOCUMENTS

| EP | 1911203 A1 * | 4/2008 | ............. H04L 12/14 |

OTHER PUBLICATIONS

Bakhshi, T., et al., "On Internet Traffic Classification: A Two-Phased Machine Learning Approach", Journal of Computer Networks and Communication, vol. 2016, Article ID 2048302, 21 pages, https://doi.org/10.1155/2016/2048302.
(Continued)

*Primary Examiner* — Anh Nguyen

(57) ABSTRACT

A processing system may obtain a first sampled flow record for a first flow in a network, comprising information regarding selected packets of the first flow, derive, from the first sampled flow record, a data volume and a duration of the first flow, and determine a first flow metric for the first flow that is calculated from the data volume and the duration, where the first flow metric is one of a plurality of flow metrics for a plurality of flows, and where the plurality of flow metrics is determined from the plurality of sampled flow records associated with the plurality of flows. The processing system may then classify the first flow into one of at least two classes, based upon the first flow metric and at least a first flow metric threshold.

20 Claims, 4 Drawing Sheets

(51) Int. Cl.
*H04L 47/2441* (2022.01)
*H04L 43/0894* (2022.01)
*H04L 43/062* (2022.01)

(58) Field of Classification Search
USPC .......................................................... 370/253
See application file for complete search history.

(56) References Cited

U.S. PATENT DOCUMENTS

| 2013/0114415 | A1* | 5/2013 | Das | H04W 16/02 |
| | | | | 370/336 |
| 2014/0280885 | A1* | 9/2014 | Ayandeh | H04L 47/39 |
| | | | | 709/224 |
| 2015/0071072 | A1* | 3/2015 | Ratzin | G06F 9/544 |
| | | | | 370/235 |
| 2017/0364581 | A1* | 12/2017 | Harutyunyan | G06F 11/3006 |
| 2018/0219879 | A1* | 8/2018 | Pierce | H04L 63/1416 |
| 2019/0190838 | A1* | 6/2019 | Shpiner | H04L 43/0876 |
| 2020/0118036 | A1* | 4/2020 | Karnagel | G06N 20/20 |
| 2020/0169509 | A1* | 5/2020 | Tigli | H04L 41/145 |

OTHER PUBLICATIONS

Jin, Y., et al., "A Modular Machine Learning System for Flow-Level Traffic Classification in Large Networks", ACM Transactions on Knowledge Discovery from Data, vol. 6, No. 1, Article 4, Mar. 2012, 34 pages.

* cited by examiner

TRAFFIC CLASSIFICATION OF ELEPHANT AND MICE DATA FLOWS IN MANAGING DATA NETWORKS

The present disclosure relates generally to network traffic classification, and more particularly to methods, computer-readable media, and apparatuses for classifying a flow into one of at least two classes based upon at least a first flow metric threshold and a flow metric calculated from a flow data volume and flow duration.

BACKGROUND

In computer data networking, a small number of Internet Protocol (IP) traffic flows, referred to as elephant flows, are usually much larger in size (e.g., a number of bits, or bytes) than the rest of the traffic flows, referred to as mice flows. In many data networks, passive probe infrastructure is used to monitor network functions, yet current infrastructure does not scale well. For example, current probe infrastructure may consume a significant fraction of cellular core network resources (e.g., up to 30 percent or more for virtualized networks). In addition, with next generation cellular networks entering deployment, the amount of network data on control plane is anticipated to increase tenfold. Furthermore, it may be beneficial to monitor the network traffic in real time, but real time monitoring further increases the complexity and computational cost for the network service provider.

SUMMARY

Methods, computer-readable media, and apparatuses for classifying a flow into one of at least two classes based upon at least a first flow metric threshold and a flow metric calculated from a flow data volume and flow duration are described. For instance, in one example, a processing system including at least one processor may obtain a first sampled flow record for a first flow in a network, where the first sampled flow record is one of a plurality of sampled flow records for a plurality of flows in the network, where the first flow is one of the plurality of flows, and where the first sampled flow record comprises information regarding selected packets of the first flow. In addition, the plurality of sampled flow records may be selected from a set of flow records for a set of flows in the network, and the set of flows may include the plurality of flows. The processing system may next derive, from the first sampled flow record, a data volume of the first flow and a duration of the first flow, and determine a first flow metric for the first flow that is calculated from the data volume of the first flow and the duration of the first flow, where the first flow metric is one of a plurality of flow metrics for the plurality of flows, and where the plurality of flow metrics is determined from the plurality of sampled flow records. The processing system may then classify the first flow into one of at least two classes, based upon the first flow metric and at least a first flow metric threshold, where a first class of the at least two classes exceeds the at least the first flow metric threshold, and where a second class of the at least two classes does not exceed the at least the first flow metric threshold.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
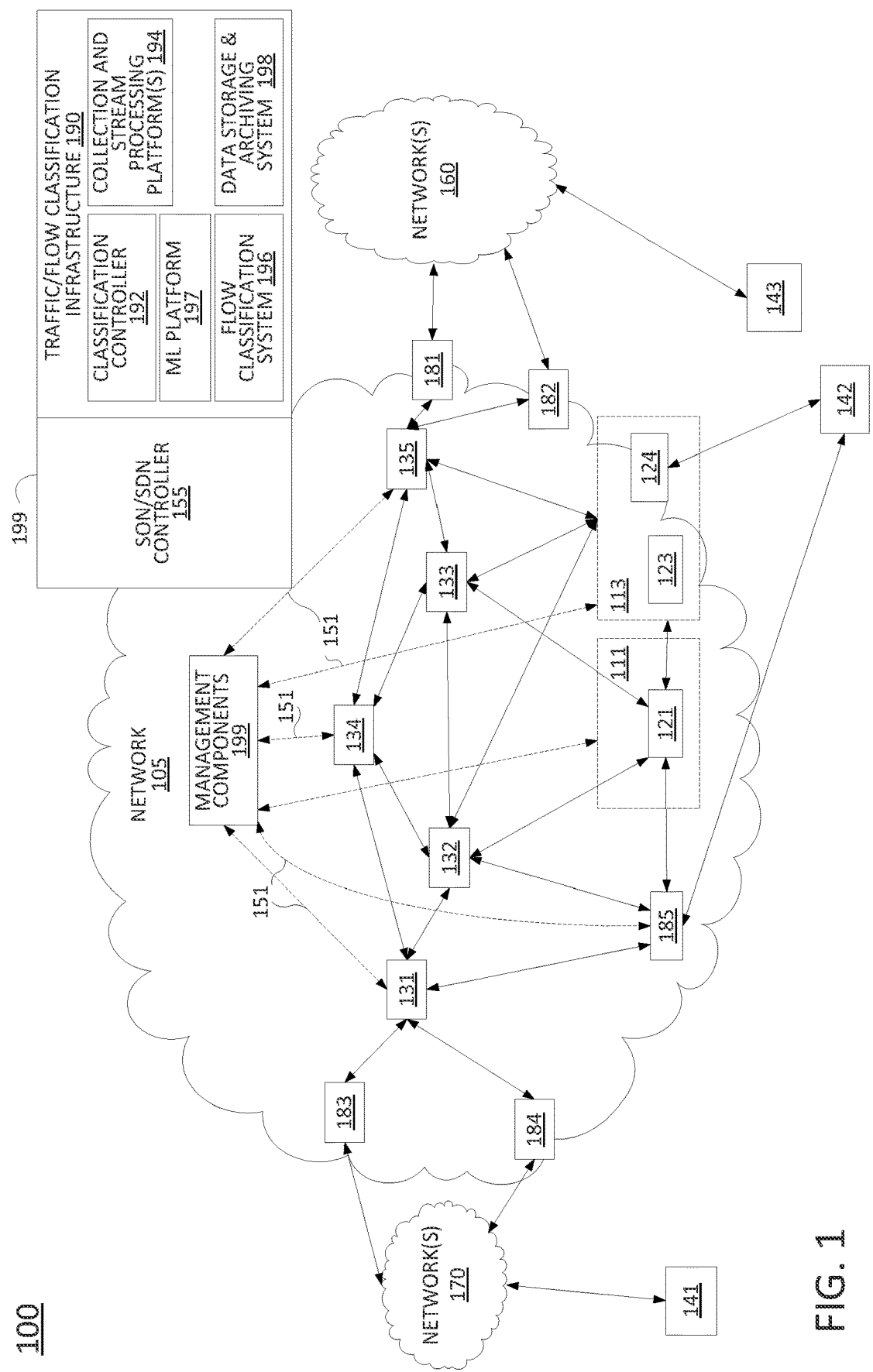
FIG. 1 illustrates an example system related to the present disclosure.

The present disclosure describes methods, computer-readable media, and apparatuses for classifying a flow into one of at least two classes based upon at least a first flow metric threshold and a flow metric calculated from a flow data volume and flow duration. In computer data networking, a small number of Internet Protocol (IP) traffic flows, referred to as elephant flows, are usually much larger in size (e.g., a number of bits, or bytes) than the rest of the traffic flows, referred to as mice flows. Traffic engineering, e.g., re-routing, load balancing, traffic offloading, may exploit these distinctions by treating elephant/mice flows differently to meet quality of service (QoS) guarantees or achieve higher efficiency. In addition, statistics of elephant/mice flows are also important in protecting data networks, such as detecting denial-of-service (DoS) attacks. Hence, it may be important to identify and track the elephant/mice flows and derive the corresponding analytics in a timely and scalable manner.

Current approaches to classifying elephant flows may rely on the availability of complete knowledge of all traffic flow records, which may be time-consuming to obtain, which may require huge amounts of data storage and computational resources, and which may be difficult to scale to a large number of routers and/or links in a data network. Furthermore, elephant/mice flows are conventionally defined based simply upon flow data volume, e.g., a number of bits or bytes, or a number of packets of a flow. However, this may be insufficient for various applications. In contrast, examples of the present disclosure enable fast and scalable elephant/mice flows classification in data networks by jointly considering flow size and flow duration to define elephant/mice flows which may lead to significantly improved performance. Examples of the present disclosure also sample IP traffic at the packet level and the flow level, which may substantially reduce the amount of data storage and computational complexity. In addition, examples of the present disclosure feature techniques to compensate for packet-level and flow-level sampling, and include representative unbiased estimators for classifying elephant/mice flows, and for generating corresponding analytics, e.g., bandwidth, arrival rate, duration, etc., which may be important to a wide range of applications including re-routing, load balancing, traffic offloading, denial-of-service detection and mitigation, and so forth. For example, the classification/detection of elephant and mice flows may enable traffic offloading at network firewalls, and may be used in memory reduction and/or automatic session table sizing based upon the distribution of elephant and mice flows and/or their associated analytics or "aggregate statistics." In the absence of the present examples, larger memory and processor utilization may be required to similarly classify flows and route, filter, or otherwise process the flow traffic accordingly.

It should also be noted that examples of the present disclosure may be applied to different implementations for solutions, including virtual functions, white box disaggregated software and hardware solutions, and traditional hardware and software custom solutions. Examples of the present disclosure also adapt to changes in traffic characteristics. For instance, in addition to normal day-to-day traffic management, the present disclosure may be employed to address changes in data flows due to weather, unusual events, or rapidly evolving traffic changes. Additionally, this methodology is independent of the protocol employed. Hence it can be applied to any data network with any type of transport. These and other aspects of the present disclosure are discussed in greater detail below in connection with the examples of FIGS. 1-4.

To aid in understanding the present disclosure, FIG. 1 illustrates a block diagram depicting one example of a communications network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additional comprise components of a cellular core network, such as a Public Land Mobile Network (PLMN), a General Packet Radio Service (GPRS) core network, and/or an evolved packet core (EPC) network, a 5G core network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) and/or containers comprising virtual network functions (VNFs). In other words, at least a portion of the network 105 may incorporate software-defined network (SDN) components.

In this regard, it should be noted that as referred to herein, "traffic" may comprise all or a portion of a transmission, e.g., a sequence or flow, comprising one or more packets, segments, datagrams, frames, cells, PDUs, service data units, bursts, and so forth. The particular terminology or types of data units involved may vary depending upon the underlying network technology. Thus, the term "traffic" is intended to refer to any quantity of data to be sent from a source to a destination through one or more networks. It should also be noted that the term "packet" may also be used to refer to any of a segment, a datagram, a frame, a cell, a PDU, a service data unit, a burst, and so forth, such as an IP packet. In one example, as referred to herein, a flow may comprise a sequence of packets having a same source address, destination address, source port, destination port, and transport layer protocol (e.g., a 5-tuple). However, in another example, a flow may be defined based upon more or less fields (e.g., a 4-tuple that is does not require a same transport layer protocol, a flow definition based upon only source IP and destination IP addresses, etc.). In addition, a flow may similarly be referred to as a "data flow" or a "traffic flow" in accordance with the present disclosure.

In one example, the network 105 may be in communication with networks 160 and networks 170. Networks 160 and 170 may each comprise a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one particular example, networks 160 and 170 may comprise 5G radio access networks. For example, as illustrated in FIG. 1, the system 100 may represent a "non-stand alone" (NSA) mode architecture where 5G radio access network components, such as a "new radio" (NR), "gNodeB" (or "gNB"), and so forth are supported by a 4G/LTE core network (e.g., where network 105 represents an Evolved Packet Core (EPC) network). However, in another example, system 100 may instead comprise a 5G "standalone" (SA) mode point-to-point or service-based architecture where EPC components and functions of network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. In addition, these various components may comprise VNFs, as described herein.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. User devices 141-143 may comprise, for example, cellular telephones, smart phones, personal computers, other wireless and wired computing devices, private branch exchanges, customer edge (CE) routers, media terminal adapters, cable boxes, home gateways and/or routers, and so forth.

In accordance with the present disclosure, user devices 141-143 may communicate with or may communicate via network 105 in various ways. For example, user device 141 may comprise a cellular telephone which may connect to network 105 via network 170, e.g., a cellular access network. For instance, such an example network 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth.

In addition, in such an example, components 183 and 184 in network 105 may comprise a serving gateway (SGW), a mobility management entity (MME), or the like. In one example, user device 142 may comprise a customer edge (CE) router which may provide access to network 105 for additional user devices (not shown) which may be connected to the CE router. For instance, in such an example, component 185 may comprise a provider edge (PE) router.

As mentioned above, various components of network 105 may comprise virtual network functions (VNFs) which may physically comprise hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. As noted above, these various virtual network functions may be container-based VNFs and/or VM-based VNFs. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may comprise host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server, a domain name service (DNS) server, a packet data network gateway (PGW), a gateway mobile switching center (GMSC), a short message service center (SMSC), etc.

Figure 4:
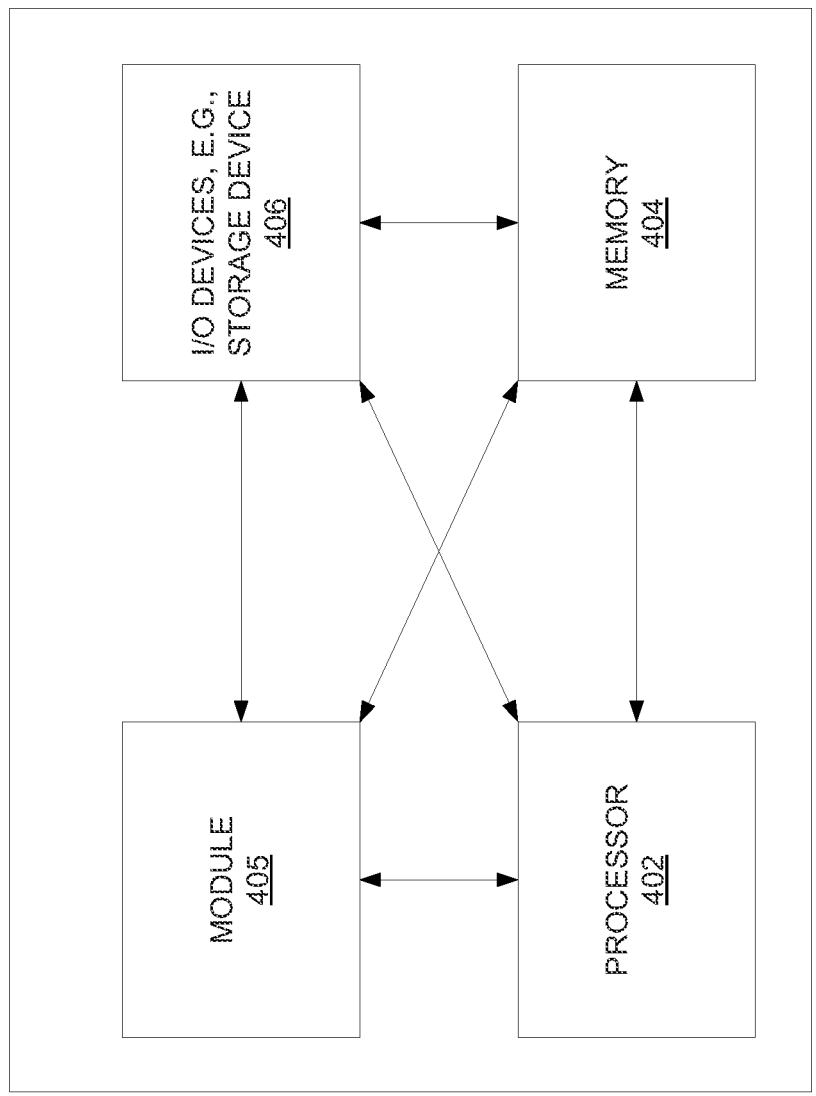
FIG. 4 illustrates a high level block diagram of a computing device specifically programmed to perform the steps, functions, blocks and/or operations described herein.

As further illustrated in FIG. 1, network 105 includes management components 199, which may include traffic/flow classification infrastructure 190 (including several components as described in greater detail below) and a self-optimizing network (SON)/software defined network (SDN) controller 155. In one example, each of the management components 199 or the management components 199 collectively may comprise a computing system or server, such as computing system 400 depicted in FIG. 4, or a processing system comprising multiple computing systems and/or servers, and may be configured to provide one or more operations or functions in connection with examples of the present disclosure for classifying a flow into one of at least two classes based upon at least a first flow metric threshold and a flow metric calculated from a flow data volume and flow duration. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 4 and discussed below) or multiple computing devices collectively configured to perform various steps, functions, and/or operations in accordance with the present disclosure.

In one example, NFVI 111 and unit 121, and NFVI 113 and units 123 and 124 may be controlled and managed by the SON/SDN controller 155. For instance, in one example, SON/SDN controller 155 is responsible for such functions as provisioning and releasing instantiations of VNFs to perform the functions of routers, switches, and other devices, provisioning routing tables and other operating parameters for the VNFs, and so forth. In one example, SON/SDN controller 155 may maintain communications with VNFs and/or host devices/NFVI via a number of control links 151 which may comprise secure tunnels for signaling communications over an underling IP infrastructure of network 105. In other words, the control links 151 may comprise virtual links multiplexed with transmission traffic and other data traversing network 105 and carried over a shared set of physical links. For ease of illustration control links associated with some of the components of network 105 are omitted from FIG. 1. In one example, the SON/SDN controller 155 may also comprise a virtual machine operating on NFVI/host device(s), or may comprise a dedicated device. For instance, SON/SDN controller 155 may be collocated with one or more VNFs, or may be deployed in a different host device or at a different physical location.

The functions of SON/SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SON/SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SON/SDN controller 155 may instruct the NFVI 113 to load the configuration code previously stored on NFVI 113 and/or to retrieve the configuration code from another device in network 105 that may store the configuration code for one or more VNFs. The functions of SON/SDN controller 155 may also include releasing or decommissioning unit 123 and/or unit 124 when no longer required, the transferring of the functions of units 123 and/or 124 to different NFVI, e.g., when NVFI 113 is taken offline, and so on.

In addition, in one example, SON/SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, for instructing optical devices at various nodes to engage in testing operations in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

In one example, SON/SDN controller 155 may function as a self-optimizing network (SON) orchestrator that is responsible for activating and deactivating, allocating and deallocating, and otherwise managing a variety of network components. For instance, SON/SDN controller 155 may set and adjust configuration parameters for various routers, switches, firewalls, gateways, and so forth. In one example, one or more of networks 160 or networks 170 may comprise cellular access networks, and SON/SDN controller 155 may activate and deactivate antennas/remote radio heads, may steer antennas/remote radio heads, may allocate or deallocate (or activate or deactivate) baseband units in a baseband unit (BBU) pool, may add (or remove) one or more network slices, may set and adjust various configuration parameters for carriers in operation at the various cell sites, and may perform other operations for adjusting configurations of cellular access network components in accordance with the present disclosure.

As illustrated in FIG. 1, network 105 may also include internal nodes 131-135, which may comprise various components, such as routers, switches, route reflectors, etc., cellular core network, IMS network, and/or VoIP network components, and so forth. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by SON/SDN controller 155 via additional control links. However, at least a portion of the internal nodes 131-135 may comprise dedicated devices or components, e.g., non-SDN reconfigurable devices.

Similarly, network 105 may also include components 181 and 182, e.g., PE routers interfacing with networks 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may comprise a serving gateway (SGW), a mobility management entity (MME), or the like. However, in another example, components 183 and 184 may also comprise PE routers interfacing with network(s) 170, e.g., for non-cellular network-based communications. In one example, components 181-185 may also comprise VNFs hosted by and operating on additional NFVI. However, in another example, at least a portion of the components 181-185 may comprise dedicated devices or components.

As mentioned above, management components 199 may further include traffic/flow classification infrastructure 190. The traffic/flow classification infrastructure 190 may include a classification controller 192, which may manage and control additional components of traffic/flow classification infrastructure 190. In one example, classification controller 192 may configure various components of network 105 and/or the system 100 to collect, enhance, and forward traffic flow data, e.g., to data storage and archiving systems 198. In one example, the traffic flow data may include raw packets that may be copied from various routers, gateways, firewalls, or other components in the network 10 (e.g., nodes 131-135, units 121, 123, 124, etc.). In one example, the traffic flow data may include information derived from the raw packets of various flows, such as packet header data (e.g., 5-tuple information, such as source IP address, destination IP address, source port, destination portion, and transport layer protocol), packet size, packet arrival time, and so forth. In one example, the traffic flow data may be aggregated over a plurality of packets of a flow, or multiple flows.

As noted above, the present disclosure may feature both packet-level and flow-level sampling. With respect to packet-level sampling, various first-level sampling components of system 100, such as routers, gateways, firewalls, etc., may be configured to sample various packets at a particular packet sampling rate (or different packet sampling rates), and may forward either the sampled packets, or information regarding the sampled packets to one or more collectors. For instance, each of components 181-184 may be first-level sampling components that may forward packets or information regarding packets to units 121 and 123, comprising collectors. For instance, components 181 and 182 may forward to unit 123, while components 183 and 184 may forward to unit 121. In one example, the sampled packets or information regarding sampled packets may be organized by flow. For instance, sampled packets and/or information regarding sampled packets may be gathered and forwarded to collectors every one minute, every five minutes, etc. In one example, one or more of components 181-184 may forward information regarding all packets handled by the respective component, while the collector(s) (e.g., units 121 and 123) may then perform packet-level sampling by sampling from among the information regarding all of the packets. In one example, units 121 and 123 may forward sampled packets, or information regarding the sampled packets to data storage and archiving system 198. In one example, units 121 and 123 may perform flow-level sampling before forwarding information regarding the sampled packets to data storage and archiving system 198. In any case, the particular configuration(s) of the first level sampling components 181-184 and the collector(s) (e.g., units 121 and 123) may be under the direction of the classification controller 192. In one example, the classification controller 192 may communicate with and instruct these various elements directly. In another example, the classification controller 192 may instruct or request that SON/SDN controller 155 configure or reconfigure the various elements in the same or a similar manner.

The data storage and archiving system 198 may obtain information regarding sampled packets for various flows. In one example, the collector(s) (e.g., units 121 and 123) may have already performed flow-level sampling. In another example, data storage and archiving system 198 may initially obtain information regarding packets for all flows that are observed within the relevant portion of system 100. The data storage and archiving system 198 may organize the information regarding the sampled packets into a flow record. For instance, information regarding sampled packets may be organized by flow at the units 121 and 123 and forwarded to data storage and archiving systems 198 as one-minute records, 5-minute records, etc. The data storage and archiving system 198 may then aggregate these records over an entire flow into a flow record. In one example, a flow may be considered ended when there are no new packets observed for a particular flow for a particular duration of time, e.g., no new packets for the flow (e.g., identified by a 5-tuple, or the like) within a five minute interval, a ten minute interval, etc. In one example, the first-level sampling components, the collector(s), and the data storage and archiving system 198 may comprise a data distribution and/or stream processing platform, such as instances of Apache Kafka, Apache Pulsar, or the like.

In one example, data storage and archiving systems 198 may represent a distributed file system, e.g., a Hadoop® Distributed File System (HDFS™), or the like. In an example where data storage and archiving system 198 obtains information regarding full/un-sampled flows, the classification controller 192 may access the gathered flow records and perform the flow sampling in accordance with the present disclosure, referred to as "smart flow sampling," as described in greater detail below.

As illustrated in FIG. 1, the traffic/flow classification infrastructure 190 further includes a flow classification system 196 and a machine learning (ML) platform 197. The flow classification system 196 may be configured to obtain sampled flow records associated with sampled flows, derive data volumes and flow durations of the sampled flows from the sampled flow records, determine flow metrics calculated from the data volumes and flow durations, and classify the sampled flows into at least two classes, based upon the plurality of flow metrics and at least a first flow metric threshold (e.g., in accordance with flow metrics per Equation 1 or Equation 2 below). In one example, classification results may be stored back into data storage and archiving systems 198 for later search and data exploration, may be aggregated into a report and provided to various consuming applications, such as for load balancing, traffic offloading, re-routing, DoS detection and mitigation, and so on.

In one example, flow classification system 196 may also determine at least one aggregate statistic based on at least one class of the at least two classes. For instance, the at least one aggregate statistic may comprise, for a given time period, at least one of: an average data volume per flow of the at least one class, an average number of packets per flow of the at least one class, an arrival rate of flows of the at least one class, an average duration per flow of the at least one class, or an average number of simultaneous flows of the at least one class. In one example, the aggregate statistics may similarly be stored back into data storage and archiving systems 198 for later search and data exploration, may be aggregated into a report and provided to various consuming applications, such as for load balancing, traffic offloading, re-routing, DoS detection and mitigation, and so on. For example, classification controller 192 may configure/reconfigure aspects of the system 100 based on the aggregate statistics, such as re-routing at least a portion of the traffic in a selected portion of the system 100, load-balancing at least a portion of the traffic in the selected portion of the system 100, offloading at least a portion of the traffic in the selected portion of the system 100, applying a denial-of-service mitigation measure in the selected portion of the system 100, and so forth.

In each example, the adjusting may include allocating at least one additional resource of the system 100 based upon the at least one aggregate statistic and/or removing at least one existing resource of the communication network based upon the at least one aggregate statistic, such as adding or removing a VM/VNF at NFVI 111. In one example, the processing system may reconfigure at least one allocated resource of the communication network differently based upon the at least one aggregate statistic that is determined, i.e., without having to allocate a new resource of the communication network. An additional resource that may be added or an existing resource that may be removed (e.g., deactivated and/or deallocated) or reconfigured may be a hardware component of the network, e.g., a baseband unit, a remote radio head, NFVI, such as NFVI 111 and 113, etc., or may be provided by hardware, e.g., bandwidth on a link, line card, router, switch, or other processing nodes, a CDN storage resource, a VM and/or a VNF, etc.

In one example, the classification controller 192 may configure and/or reconfigure components of system 100 directly, or may instruct or request SON/SDN controller 155 to make the same or similar adjustments. Alternatively, or in addition, SON/SDN controller 155 may obtain classification results and/or aggregate statistics and may make similar determinations as to whether and when to make adjustments to the system 100 in response thereto.

In one example, the classification results may be provided to ML platform 197 or obtained by ML platform 197 from data storage and archiving systems 198. In one example, ML platform 197 may train a classifier to detect a flow classification for new flows, e.g., based upon a 5-tuple and an initial portion of flows of the particular class (e.g., the first 10 packets, the first 50 packets, etc.). In one example, the classifier may comprise a binary classifier, such as a support vector machine (SVM). In one example, different binary classifiers may be trained, e.g., one per each class. In another example, the classifier(s) may be a random forest-based classifier learned on features such as a 5-tuple, number of bytes, rate, and/or duration of an initial portion of a flow. Alternatively, or in addition, the ML platform 197 may generate a pass/block list (e.g., a "whitelist/blacklist") based upon a packet header information, which may be dependent upon the particular use case. For instance, for detecting malicious traffic, elephant flows may be passed, while mice flows may be further processed at a network firewall. However, for load balancing, mice flows may be ignored, while elephant flows may be considered for offloading, rerouting, instantiating additional routers, caches, etc., and so on.

The trained classifier(s) and/or pass/block lists may thus be provided to various components of the system 100, such as components 181-184 for use in real-time flow classification/prediction. The real-time flow classification/prediction may be used for the same or similar application as noted above, e.g., load balancing, traffic offloading, re-routing, DoS detection and mitigation, and so on. In one example, the classifier(s) may be retrained and/or redeployed to components of the system 100, e.g., periodically, in response to a prediction accuracy falling below a threshold, and so forth. For instance, predictions made by components of the system 100 in real-time may be checked against actual results determined via the flow classification system 196 to determine a prediction accuracy. Alternatively, or in addition, a retraining interval may be selected and/or adjusted based on storage or other constraints, such as many flow record can be stored at data storage and archiving system 198. In one example, the classification controller 192 may provide trained classifier(s) to components of the system 100 for deployment and/or may instruct the components to obtain the trained classifier(s), e.g., from data storage and archiving system 198. In another example, SON/SDN controller 155 may obtain trained classifier(s) and deploy the classifier(s) to components of the system 100.

The traffic/flow classification infrastructure 190 is illustrated at a high-level in FIG. 1. For instance, details of the hierarchical structure of flow data collection, the physical layout of data storage and archiving system 198, and so forth are omitted from illustration in FIG. 1. Thus, these and other aspects of traffic/flow classification infrastructure 190 are described in greater detail below in connection with the examples of FIGS. 2-4.

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. In still another example, SON/SDN controller 155, all or some of the components of traffic/flow classification infrastructure 190, and/or other network elements may comprise functions that are spread across several devices that operate collectively as a SDN controller, a data distribution platform, a stream processing system, a data storage system, etc. Thus, these and other modifications of the system 100 are all contemplated within the scope of the present disclosure.

Figure 2:
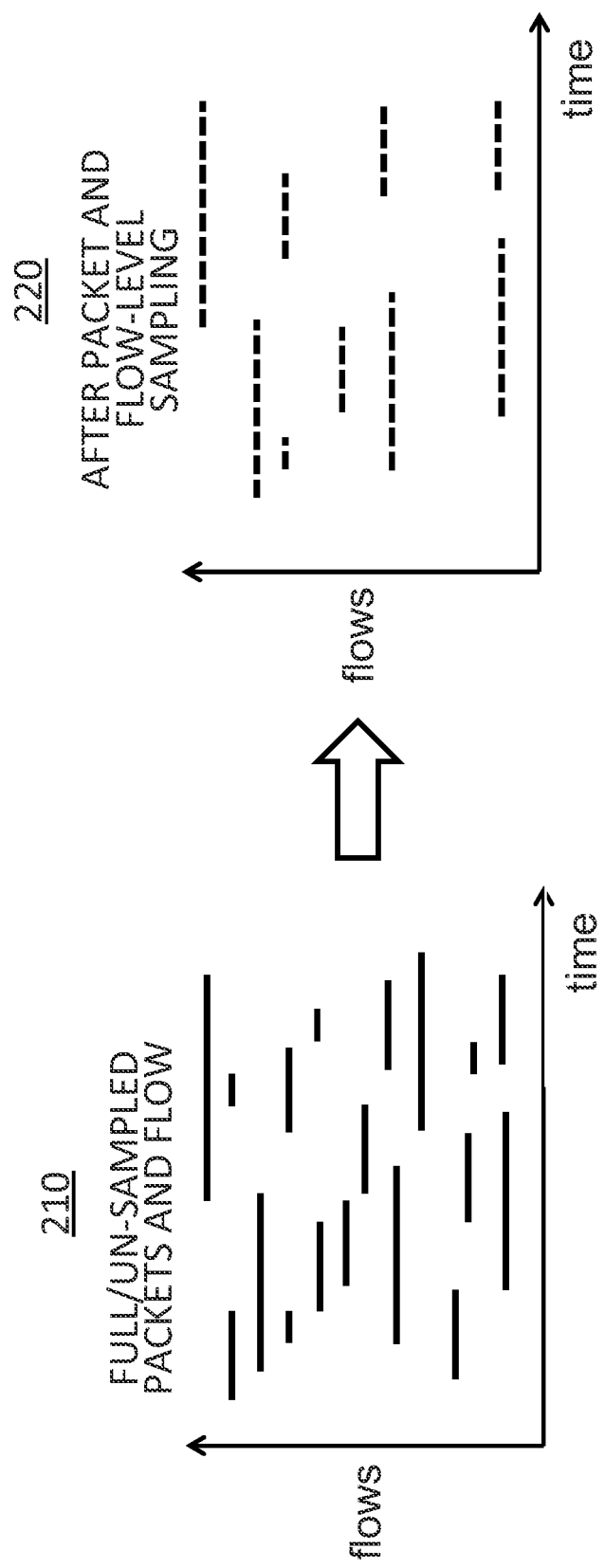
FIG. 2 illustrates an example flow level and packet level sampling, in accordance with the present disclosure.

FIG. 2 illustrates an example of flow level and packet level sampling of the present disclosure. For instance, the first graph 210 illustrates a set of different flows and their durations over time. The second graph 220 illustrates the same set after packet and flow-level sampling. It can be seen that in the second graph 220, some of the flows present in the first graph 210 have been dropped. At the same time, for flows that remain, it can be seen in the second graph 220 that some packets (or information regarding associated packets) of the remaining flows are dropped, while some packets remain, i.e., from the result of sampling.

As noted above, examples of the present disclosure enable fast and scalable elephant/mice flow classification in data networks by jointly considering flow size and flow duration to define elephant/mice flows which may lead to significantly improved performance. Examples of the present disclosure also sample IP traffic at the packet level and the flow level, such as illustrated in FIG. 2, which may substantially reduce the amount of data storage and computational complexity. In addition, examples of the present disclosure feature techniques to compensate for packet-level and flow-level sampling for generating corresponding analytics.

In one example, the present disclosure may define elephant flows as flows with a ratio of a data volume (e.g., a number of bits/bytes) to a duration that is above a threshold, e.g., per Equation 1:

$$\frac{b_f}{d_f} > r \qquad \text{Equation 1}$$

In Equation 1, $b_f$ is a data volume (e.g., a number of bits or bytes) of flow f, $d_f$ is a duration of flow f, and r is a threshold ratio.

Another example of the present disclosure may define elephant flows as flows with weighted difference between a data volume and a flow duration that is above a threshold, e.g., per Equation 2:

$$b_f - \alpha d_f > r \qquad \text{Equation 2:}$$

In Equation 2, $b_f$ is a data volume (e.g., a number of bits or bytes) of flow f, $d_f$ is a duration of flow f, $\alpha$ is a weighting factor, and r is a threshold ratio.

In one example, the ratio r may be set as some value that represents a cutoff for flows that represent a certain percentage of a total traffic volume observed in a relevant portion of a network. For instance, 90 percent of traffic transiting a particular firewall, 85 percent of incoming traffic at a set of provider edge routers in a particular zone of the network, etc.

For instance, the top X number of flows organized by flow metrics per Equation 1 or Equation 2 that represent 90 percent (or some other threshold percentages) of the total traffic in the portion of the network during a selected time period may be determined to be elephant flows, while the remaining flows may be determined to be mice flows. The selected time period may be a sliding window, e.g., of 1 hour duration, a given time block, e.g., an hourly interval, a 30 minute interval, etc., and so on. The relevant portion of the network may range from a single network component to numerous components within a network zone, or even the entire network, depending upon the network size.

As noted above, a flow, e.g., an IP flow, may be identified by a 5-tuple of source IP address, destination IP address, source port, destination port, and transmission layer protocol. In the present example, several notations are now described. Packet sampling may be configured at one or more first-level sampling components at a rate of N (e.g., a positive integer value). Given the stream of packets of all flows, one packet is sampled for every N packets. For sampling factor N, each packet is sampled with probability 1/N independently. The number of bytes of a flow may be denoted as b. The observed number of bytes after packet sampling may be denoted as $b^s$.

$$E[b^s] = \frac{1}{N} b \qquad \text{Equation 3}$$

In Equation 3, $E[b^s]$ is the expectation of the number of sampled bytes given the actual number of bytes of a flow b, and the sampling rate/factor N. Thus an unbiased estimator b for the number of bytes of a flow is given by Equation 4 (where the ^ symbol indicates an estimator of a variable):

$$\hat{b} = N \cdot b^s \qquad \text{Equation 4:}$$

A determination of the threshold/cutoff for elephant/mice flows taking into account flow level sampling is now described. To illustrate, a threshold for "smart flow sampling" may be denoted as t. In smart flow sampling, if the data volume (e.g., number of bytes) of the flow b is greater than t, it is sampled with probability one (1); otherwise, it is sampled with probability b/t. For instance, the smart flow sampling mitigates the effect of heavy-tailed flow size distribution. To estimate a number of flows of a particular size, given an actual flow of size b (e.g., within a given time window T) in view of the "smart sampling" technique above, assume that for flows of size b bytes, there are in reality C(b) such flows. In one example, packets may be sampled and flow records generated at routers or other first-level sampling components, where the flow records are forwarded to a collector via Uniform Datagram Protocol (UDP). In such an example, it may be assumed that flow records may be lost in transit at a flow loss rate q, which may be measured in the network and recorded. However, in the following example, the formula may account for reliable transmission protocols (e.g., lossless protocols) where the factor q may be set to 1 (such as for Transmission Control Protocol (TCP)). For instance, Equation 5 represents the expected number of flows after smart sampling and accounting for possible transmission loss:

$$E[C^s(b)] = \begin{cases} (1-q)C(b) & \text{if } b \geq t \\ \frac{b}{t}(1-q)C(b) & \text{if } b < t \end{cases} \quad \text{Equation 5}$$

It can be seen that when the flow size, e.g., a number of bytes, b, does not exceed the sampling threshold, t, an initial scaling factor b/t is applied in Equation 5. On the other hand, when the flow size, e.g., a number of bytes, b, exceeds the sampling threshold, t, the flows are sampled with probability one (1), and hence there is no initial scaling factor (or the factor may be considered to be a one (1)). From Equation 5, an unbiased estimator C(b) for the number of flows of size b, may then be given per Equation 6:

$$\hat{C}(b) = \begin{cases} \frac{1}{(1-q)}C(b) & \text{if } b \geq t \\ \frac{t}{b} \cdot \frac{1}{(1-q)}C(b) & \text{if } b < t \end{cases} \quad \text{Equation 6}$$

Applying Equation 6 and taking into account all of the sampled flows being considered in a time window T, the total volume of traffic over all flows in the relevant portion of the network may be estimated. Then, as noted above, the flows may be arranged in descending order ranked based upon the flow metric of Equation 1 or Equation 2. The data volume, or size, of each flow may be then counted, in descending order, until 90 percent or some other threshold percentage of the total traffic volume is reached. Those flows that are counted before reaching the threshold/cutoff are determined to be elephant flows, for example, while the remaining flows may be determined to be mice flows.

In one example, when counting the aggregate data volume of flows in descending order, if a flow is of size b that is less than the smart sampling threshold t, the contribution of the flow to the count of the aggregate data volume may be defined by the second option of Equation 6, rather than the actual data volume of the flow. However, in another example, the actual data volumes/sizes of flows may be counted, regardless of whether the size exceed the smart sampling threshold.

Next, an example of calculating an aggregate statistic accounting for flow level sampling is described. Specifically, an unbiased estimator for the arrival rate of elephant flows $\hat{\lambda}^e$ is given per Equation 7:

$$\hat{\lambda}^e = \frac{1}{T}\sum_f 1f \in (\text{elephant flows}) \cdot \begin{cases} \frac{1}{(1-q)} & \text{if } b \geq t \\ \frac{t}{b_f} \cdot \frac{1}{(1-q)} & \text{if } b < t \end{cases} \quad \text{Equation 7}$$

In the example of Equation 7, the number of bytes of a flow $b_f$ may be estimated via the above-described packet sampling compensation of Equation 4.

It should also be noted that a similar example may be followed to calculate the average arrival rate for flows of any type of category (e.g., mice flows), given the set of flows being predetermined. For instance, the set of elephant flows may be determined as described above (and similarly for a set of mice flows, e.g., being those that are not determined to be elephant flows). In this regard, it should be further noted that although examples of the present disclosure are described herein primarily in connection with distinguishing between two classes of flows (e.g., "elephant" and "mice" flows), in other, further, and different examples, more classes/categories may be determined. For instance, the present disclosure may apply two thresholds such as 90 percent of traffic and the next 8 percent of traffic to define three different classes/categories. In another example, the present disclosure may apply three thresholds to determine four different classes/categories, and so on.

Equation 8 illustrates an additional example of calculating an aggregate statistic, accounting for flow level sampling in accordance with the present disclosure. Specifically, Equation 8 illustrates an unbiased estimator for the average duration of elephant flows $\hat{d}^e$ in a given time interval T:

$$\hat{d}^e = \frac{\sum_f 1f \in (\text{elephant flows}) \cdot d_f \cdot \begin{cases} \frac{1}{(1-q)} & \text{if } b \geq t \\ \frac{t}{b_f} \cdot \frac{1}{(1-q)} & \text{if } b < t \end{cases}}{\sum_f 1f \in (\text{elephant flows}) \begin{cases} \frac{1}{(1-q)} & \text{if } b \geq t \\ \frac{t}{b_f} \cdot \frac{1}{(1-q)} & \text{if } b < t \end{cases}} \quad \text{Eq. 8}$$

As in the example of Equation 7, it should be noted that a similar process may be applied to determine the average duration of mice flows (or any category of flows that is predetermined).

In addition, the foregoing are just two examples of aggregate statistics for a category of flows that may be calculated from sampled flow records in accordance with the present disclosure. Thus, it should be understood that similar formulas compensating for smart flow sampling and possible transmission loss may be utilized to derive an average data volume of a particular category of flows (e.g., an average number of bytes, bits, and/or packets of elephant flows (or mice flows)), a number of simultaneous elephant flows (or mice flows) in a given time interval, and so forth.

In one example, the classification of flows into categories and the further calculation of various aggregate statistics for one or more classes of flows may be performed by flow classification system 196 of FIG. 1. In addition, it should be noted in connection with the examples of Equations 1-8 that classification controller 192 may update a packet sampling rate (or different rates for different devices, network zones/regions, etc.) and/or flow sampling rate(s) to balance accuracy with complexity of storage and/or calculation time. In one example, the classification controller 192 may similarly configure or reconfigure flow classification system to apply different threshold(s) for distinguishing between classifications/categories, to calculate new or different aggregate statistics, and so forth. In this regard, classification controller 192 may communicate with one or more data consuming applications/subscribers as to application-specific classification requirements (e.g., particular thresholds/cutoffs), application-specific aggregate statistics to be provided (e.g., which output(s) of flow classification system 196 to subscribe to or otherwise be provided or obtained), and so on.

Figure 3:
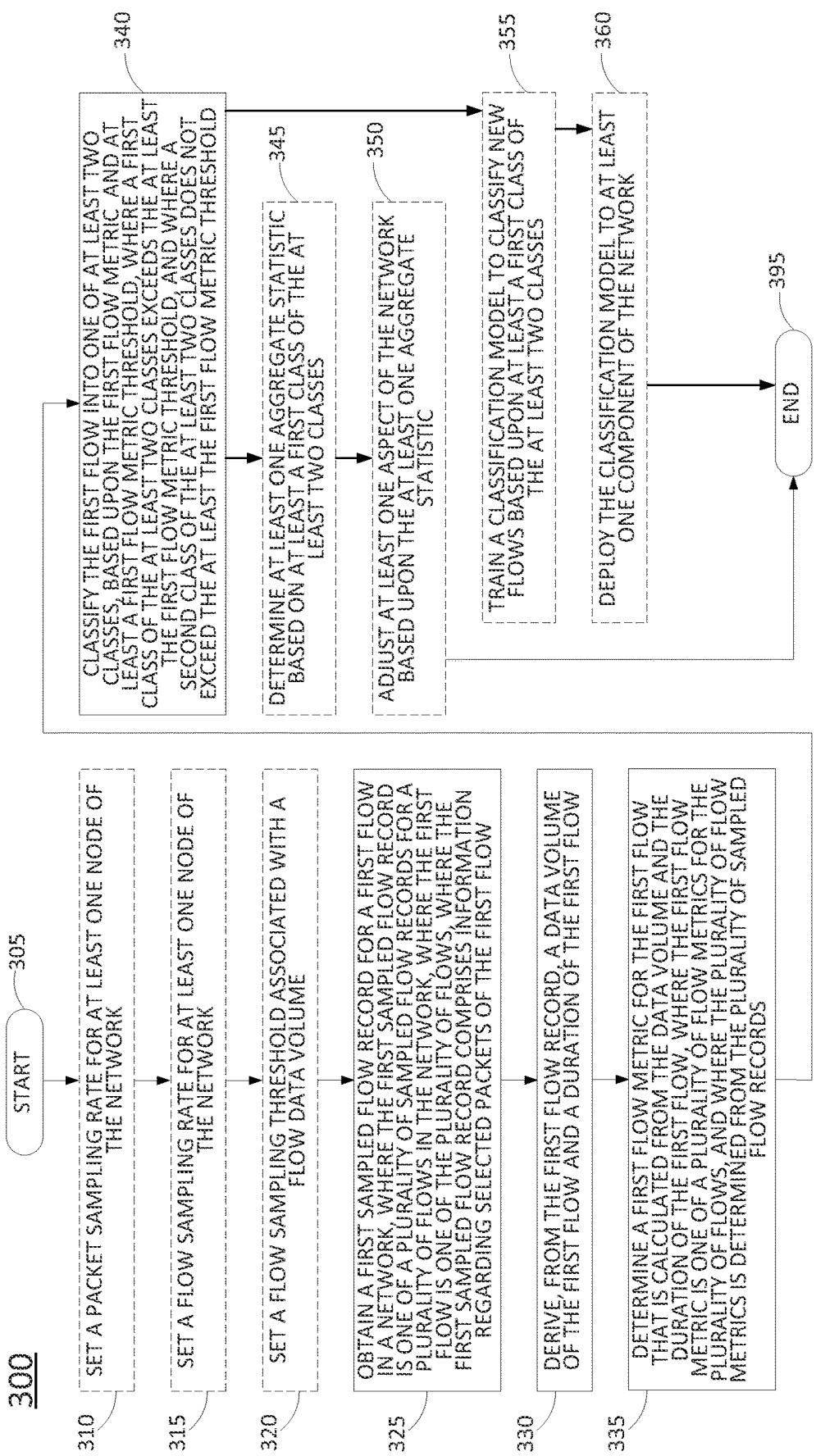
FIG. 3 illustrates a flowchart of an example method for classifying a flow into one of at least two classes based upon at least a first flow metric threshold and a flow metric calculated from a flow data volume and flow duration.

FIG. 3 illustrates a flowchart of an example method 300 for classifying a flow into one of at least two classes based upon at least a first flow metric threshold and a flow metric calculated from a flow data volume and flow duration, in accordance with the present disclosure. In one example, the method 300 is performed by a processing system, e.g., one or more components of a traffic/flow classification infrastructure of a telecommunication network (such as traffic/flow classification infrastructure 190 of FIG. 1) or by one or more components thereof, (e.g., a processor, or processors, performing operations stored in and loaded from a memory), or by a traffic/flow classification infrastructure in conjunction with other components such as routers, switches, firewalls, or other first-level sampling components, collector(s), an SON orchestrator and/or SDN controller, etc. In one example, the steps, functions, or operations of method 300 may be performed by a computing device or system 400, and/or processor 402 as described in connection with FIG. 4 below. For instance, the computing device or system 400 may represent any one or more components of the system 100 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to one of the optional steps 310-320 or to step 325.

At optional step 310, the processing system may set a packet sampling rate for at least one node of the network, wherein the selected packets of the first flow are selected in accordance with the packet sampling rate.

At optional step 315, the processing system may set a flow sampling rate for at least one node of the network, wherein the plurality of sampled flow records including the first sampled flow record is selected in accordance with the flow sampling rate.

At optional step 320, the processing system may set a flow sampling threshold associated with a flow data volume, wherein the plurality of sampled flow records including the first sampled flow record is selected in accordance with the flow sampling rate and the flow sampling threshold. For instance, rates can be adjusted for how much storage the system has available. It should be noted that in one example, optional steps 310-320 may include the processing system instructing or requesting a SON orchestrator and/or an SDN controller to configure and/or reconfigure various network components in order to sample packets, assemble flow records, sampling flow records, forward sampled packets and/or flow records to collectors and/or a data storage/archiving system, and so forth. Alternatively, or in addition, the processing system performing the method 300 may further comprise any one or more of these components, platforms, or systems.

At step 325, the processing system obtains a first sampled flow record for a first flow in a network, wherein the first sampled flow record is one of a plurality of sampled flow records for a plurality of flows in the network, where the first flow is one of the plurality of flows, where the first sampled flow record comprises information regarding selected packets of the first flow, where the plurality of sampled flow records is selected from a set of flow records for a set of flows in the network, wherein the set of flows includes the plurality of flows. In one example, each sampled flow record of the plurality of sampled flow records comprises information regarding selected packets of a respective flow of the plurality of flows. For instance, the selected packets may be selected from a set of packets of the first flow. For example, the set of packets may comprise all of the packets that are observed from the first flow. In addition, each respective sampled flow record of the plurality of sampled flow records may comprise respective selected packets that are selected from a respective set of packets of the respective sampled flow record. The sampled packets and/or the sampled flow records may be obtained from one or more components, platforms, or systems of the network that are configured to collect, sample, enhance, and/or forward sampled packets and/or flow records as described above. In one example, step 325 may include obtaining each of the plurality of sampled flow records.

In one example, each respective sampled flow record of the plurality of sampled flow records is selected to be included in the plurality of sampled flow records when a respective flow of the plurality of flows associated with the respective sampled flow record has a respective data volume that exceeds a threshold data volume, or the respective flow does not exceed the threshold data volume, and when the respective sampled flow record is chosen in accordance with a selection probability that is proportional to the respective data volume of the respective flow. In other words, larger flows may be more likely to be selected (and flows exceeding the sampling threshold are selected with probability of one (1)). In one example, the threshold may be different or may be adjusted for different use cases. For instance, larger flows are more likely to be important for traffic offloading/rerouting, and thus a lower threshold may be used to ensure that more large flows are captured.

At step 330, the processing system derives, from the first flow record, a data volume of the first flow and a duration of the first flow. For instance, the data volume may comprise a number of bits or a number of bytes. In addition, the data volume may be calculated from the information regarding the selected packets and a packet sampling rate. For example, the information regarding the selected packets may include the number of bits/bytes of the selected packet. In one example, step 330 further comprises deriving, from the plurality of sampled flow records, a respective data volume and a respective duration of each flow of the plurality of flows.

At step 335, the processing system determines a first flow metric for the first flow that is calculated from the data volume of the first flow and the duration of the first flow, where the first flow metric is one of a plurality of flow metrics for the plurality of flows, and where the plurality of flow metrics is determined from the plurality of sampled flow records. In one example, each of the plurality of flow metrics comprises a ratio of the data volume of a respective flow of the plurality of flows and the duration of the respective flow (e.g., per Equation 1 above). In another example, each of the plurality of flow metrics comprises a difference between a data volume of a respective flow of the plurality of flows and a weighted duration of the respective flow (e.g., per Equation 2 above).

At step 340, the processing system classifies the first flow into one of at least two classes, based upon the first flow metric and at least a first flow metric threshold, where a first class of the at least two classes exceeds the at least first flow metric threshold, and where a second class of the at least two classes does not exceed the at least first flow metric threshold. In one example, step 340 comprises classifying the plurality of flows into the at least two classes, based upon the plurality of flow metrics and the at least the first flow metric threshold. In one example, the first flow metric threshold comprises a percentage of a total data volume in a selected portion of the network, where step 340 comprises ranking the plurality of flows in descending order of the plurality of flow metrics and determining a subset of the plurality of flows, starting with one of the plurality of flows having a highest flow metric of the plurality of flow metrics and descending in the order of the plurality of flow metrics for which an adjusted collective data volume comprises the first flow metric threshold. For instance, the subset of the plurality of flows may comprise the first class. In one example, flow metric threshold(s) can be set differently for different applications, e.g., traffic offloading of elephant flows may have a useful threshold of 90 percent of the total data volume, while a cutoff for determining elephant flows and mice flows for detection of DoS attacks may have a useful threshold of 95 percent and so on.

In one example, the adjusted collective data volume may be calculated by: (1) for each respective flow of the subset of the plurality of flows having a respective data volume above a flow sampling threshold, adding, to the adjusted collective data volume, the respective data volume above the flow sampling threshold in accordance with a first scaling factor, and (2) for each respective flow of the subset of the plurality of flows having a respective data volume that does not exceed the flow sampling threshold, adding, to the adjusted collective data volume, the respective data volume that does not exceed the flow sampling threshold in accordance with a second scaling factor. In one example, the first scaling factor comprises a value of one (1) (e.g., for no transport layer loss). In another example, the first scaling factor may comprise a value of one (1) minus a transport layer transmission loss rate associated with the selected portion of the network (or equivalently a transport layer transmission success rate associated with the selected portion of the network). In addition, in one example, the second scaling factor may comprise an inverse of a sampling ratio (e.g., for no transport layer loss). In another example, the second scaling factor may comprise an inverse of a sampling ratio times an inverse of a transport layer transmission success rate associated with the selected portion of the network (or equivalently an inverse of a sampling ratio times an inverse of one minus a transport layer transmission loss rate associated with the selected portion of the network). For instance, the adjusted collective data volume may be calculated by applying Equation 6 above to each respective flow and adding to the total.

At optional step 345, the processing system may determine at least one aggregate statistic based on at least a first class of the at least two classes. For instance, the at least one aggregate statistic may comprise, for a given time period, at least one of: an average data volume per flow of the at least the first class, an average number of packets per flow of the at least the first class, an arrival rate of flows of the at least the first class, an average duration per flow of the at least the first class, or an average number of simultaneous flows of the at least the first class. In one example, for each respective flow of the at least the first class having a respective data volume above a flow sampling threshold, a value associated with the respective flow having the respective data volume above the flow sampling threshold is contributed to a calculation of the at least one aggregate statistic in accordance with a first scaling factor. In addition, for each respective flow of the at least the first class having a respective data volume that does not exceed the flow sampling threshold, a value associated with the respective flow having the respective data volume that does not exceed the flow sampling threshold is contributed to a calculation of the at least one aggregate statistic in accordance with a second scaling factor. For instance, the first scaling factor and the second scaling factor may be the same as noted above in connection with step 340.

At optional step 350, the processing system may adjust at least one aspect of the network based upon the at least one aggregate statistic, such as re-routing at least a portion of the traffic in a selected portion of the network, load-balancing at least a portion of the traffic in the selected portion of the network, offloading at least a portion of the traffic in the selected portion of the network, applying a denial-of-service mitigation measure in the selected portion of the network, and so forth. In each example, the adjusting may include allocating at least one additional resource of the network based upon the at least one aggregate statistic and/or removing at least one existing resource of the communication network based upon the at least one aggregate statistic. In one example, the processing system may reconfigure at least one allocated resource of the communication network differently based upon the at least one aggregate statistic that is determined, i.e., without having to allocate a new resource of the communication network. In accordance with optional step 350, an additional resource that may be added or an existing resource that may be removed (e.g., deactivated and/or deallocated) may be a hardware component of the network, or may be provided by hardware, e.g., bandwidth on a link, line card, router, switch, or other processing node, a CDN storage resource, a VM and/or a VNF, etc.

At optional step 355, the processing system may train a classification model to classify new flows based upon at least a first class of the at least two classes, where the classification model is trained in accordance with information regarding selected packets of each flow record of the plurality of flows that is contained in respective sampled flow records of the plurality of sampled flow records for flows of the at least the first class. For instance, the information regarding the selected packets of each flow record may comprise a 5-tuple or the like, and may include a duration of an initial number of packets and/or a data volume of an initial number of packets of each flow. In one example, sampled flow records of the at least the first class may comprise positive training and/or testing examples. In one embodiment, negative training and/or testing examples may be taken from sampled flow records of one or more other classes. The classification model may comprise a binary classifier, such as a support vector machine (SVM), a random forest-based machine learning model, and so forth.

At optional step 360, the processing system may deploy the classification model to at least one component of the network, such as a firewall, a router, etc. For instance, the classification model may be used for real-time elephant/mice flow detection and for corresponding traffic re-routing, filtering, quality of service (QoS) tagging, malicious traffic scanning, etc.

Following step 340 or any of optional steps 345-360, the method 300 proceeds to step 395 where the method 300 ends.

It should be noted any of the example method 300 may be expanded to include additional steps, or may be modified to replace steps with different steps, to combine steps, to omit steps, to perform steps in a different order, and so forth. For instance, in one example the processing system may repeat one or more steps of the method 300, such as steps 325-340, steps 310-350, steps 325-360, and so forth. In one example, the method 300 may further include adding the first flow, e.g., information of the first flow such as a 5-tuple or the like, to a filtering rule (e.g., a pass/block list) and/or deploying the filtering rule to at least one component of the network. In still another example, the method 300 may include registering subscribers (e.g., network components or applications) and providing classification result(s) of step 340 and/or aggregate statistics of optional step 345 to the one or subscribers. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing system 400 (e.g., a computing device, or processing system) specifically programmed to perform the functions described herein. For example, any one or more components or devices illustrated in FIG. 1 or discussed in connection with the examples of FIGS. 2 and 3 may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where hardware processor element may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for classifying a flow into one of at least two classes based upon at least a first flow metric threshold and a flow metric calculated from a flow data volume and flow duration, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, it should be noted that the computing device may employ a plurality of hardware processor elements. Furthermore, although only one computing device is shown in FIG. 4, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 4 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for classifying a flow into one of at least two classes based upon at least a first flow metric threshold and a flow metric calculated from a flow data volume and flow duration (e.g., a software program comprising computer-executable instructions) can be loaded into memory 404 and executed by hardware processor element 402 to implement the steps, functions or operations as discussed above in connection with the example method (s). Furthermore, when a hardware processor executes instructions to perform "operations," this could include the hardware processor performing the operations directly and/ or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for classifying a flow into one of at least two classes based upon at least a first flow metric threshold and a flow metric calculated from a flow data volume and flow duration (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, a first sampled flow record for a first flow in a network, wherein the first sampled flow record is one of a plurality of sampled flow records for a plurality of flows in the network, wherein the first flow is one of the plurality of flows, wherein the first sampled flow record comprises information regarding selected packets of the first flow, wherein the plurality of sampled flow records is selected from a set of flow records for a set of flows in the network, and wherein the set of flows includes the plurality of flows;
deriving, by the processing system from the first sampled flow record, a data volume of the first flow and a duration of the first flow;
determining, by the processing system, a first flow metric for the first flow that is calculated from a first difference between the data volume of the first flow and a weighted duration of the first flow, wherein the weighted duration of the first flow comprises a duration of the first flow modified by a weighting factor, wherein the duration of the first flow is from a beginning of the first flow to an end of the first flow, wherein the first flow metric is one of a plurality of flow metrics for the plurality of flows, wherein the plurality of flow metrics is determined from the plurality of sampled flow records; and
classifying, by the processing system, the first flow into one of at least two classes, based upon the first flow metric and at least a first flow metric threshold, wherein a first class of the at least two classes exceeds the at least the first flow metric threshold, and wherein a second class of the at least two classes does not exceed the at least the first flow metric threshold.

2. The method of claim 1, wherein the selected packets are selected from a set of packets of the first flow, and wherein each one of the selected packets is sampled from every N packets from the set of packets of the first flow, where N is a sampling factor and each packet of the set of packets is sampled with a probability 1/N independently.

3. The method of claim 1, wherein the data volume comprises a number of bits or a number of bytes.

4. The method of claim 3, wherein the data volume is calculated from the information regarding the selected packets and a packet sampling rate.

5. The method of claim 1, wherein each respective sampled flow record of the plurality of sampled flow records is selected to be included in the plurality of sampled flow records when:
a respective flow of the plurality of flows associated with the respective sampled flow record has a respective data volume that exceeds a threshold data volume; or
the respective flow does not exceed the threshold data volume, and when the respective sampled flow record is chosen in accordance with a selection probability that is proportional to the respective data volume of the respective flow.

6. The method of claim 1, wherein each of the plurality of flow metrics comprises a difference between a data volume of a respective flow of the plurality of flows and a weighted duration of the respective flow.

7. The method of claim 1, wherein the first flow metric threshold comprises a percentage of a total data volume in a selected portion of the network, wherein classifying the first flow into the one of the at least two classes comprises:
ranking the plurality of flows in a descending order of the plurality of flow metrics; and
determining a subset of the plurality of flows starting with one of the plurality of flows having a highest flow metric of the plurality of flow metrics and descending in the descending order of the plurality of flow metrics for which an adjusted collective data volume comprises the first flow metric threshold.

8. The method of claim 7, wherein the subset of the plurality of flows comprises the first class.

9. The method of claim 7, wherein the adjusted collective data volume is calculated by:
for each respective flow of the subset of the plurality of flows having a respective data volume above a flow sampling threshold, adding, to the adjusted collective data volume, the respective data volume above the flow sampling threshold in accordance with a first scaling factor; and
for each respective flow of the subset of the plurality of flows having a respective data volume that does not exceed the flow sampling threshold, adding, to the adjusted collective data volume, the respective data volume that does not exceed the flow sampling threshold in accordance with a second scaling factor.

10. The method of claim 9, wherein the first scaling factor comprises:
a value of one;
a value of one minus a transport layer transmission loss rate associated with the selected portion of the network; or
a transport layer transmission success rate associated with the selected portion of the network.

11. The method of claim 9, wherein the second scaling factor comprises:
an inverse of a sampling ratio;
an inverse of a sampling ratio times an inverse of a transport layer transmission success rate associated with the selected portion of the network; or
an inverse of a sampling ratio times an inverse of one minus a transport layer transmission loss rate associated with the selected portion of the network.

12. The method of claim 1, further comprising:
determining at least one aggregate statistic based on at least the first class of the at least two classes.

13. The method of claim 12, wherein the at least one aggregate statistic comprises, for a given time period, at least one of:

an average data volume per flow of the at least the first class;
an average number of packets per flow of the at least the first class;
an arrival rate of flows of the at least the first class;
an average duration per flow of the at least the first class; or
an average number of simultaneous flows of the at least the first class.

14. The method of claim 13, wherein for each respective flow of the at least the first class having a respective data volume above a flow sampling threshold, a value associated with the respective flow having the respective data volume above the flow sampling threshold is contributed to a calculation of the at least one aggregate statistic in accordance with a first scaling factor, and wherein for each respective flow of the at least the first class having a respective data volume that does not exceed the flow sampling threshold, a value associated with the respective flow having the respective data volume that does not exceed the flow sampling threshold is contributed to a calculation of the at least one aggregate statistic in accordance with a second scaling factor.

15. The method of claim 13, further comprising:
adjusting at least one aspect of the network based upon the at least one aggregate statistic.

16. The method of claim 15, wherein the adjusting comprises at least one of:
re-routing at least a portion of traffic in a selected portion of the network;
load-balancing at least a portion of traffic in the selected portion of the network;
offloading at least a portion of traffic in the selected portion of the network; or
applying a denial-of-service mitigation measure in the selected portion of the network.

17. The method of claim 1, further comprising:
training a classification model to classify new flows based upon at least the first class of the at least two classes, wherein the classification model is trained in accordance with information regarding selected packets of each flow of the plurality of flows that is contained in respective sampled flow records of the plurality of sampled flow records for flows of the at least the first class.

18. An apparatus comprising:
a processing system including at least one processor; and
a computer-readable medium storing instructions which, when executed by the processing system, cause the processing system to perform operations, the operations comprising:
obtaining a first sampled flow record for a first flow in a network, wherein the first sampled flow record is one of a plurality of sampled flow records for a plurality of flows in the network, wherein the first flow is one of the plurality of flows, wherein the first sampled flow record comprises information regarding selected packets of the first flow, wherein the plurality of sampled flow records is selected from a set of flow records for a set of flows in the network, wherein the set of flows includes the plurality of flows;
deriving, from the first sampled flow record, a data volume of the first flow and a duration of the first flow;
determining a first flow metric for the first flow that is calculated from a first difference between the data volume of the first flow and a weighted duration of the first flow, wherein the first flow metric is one of a plurality of flow metrics for the plurality of flows, wherein the plurality of flow metrics is determined from the plurality of sampled flow records, wherein the weighted duration of the first flow comprises a duration of the first flow modified by a weighting factor, wherein the duration of the first flow is from a beginning of the first flow to an end of the first flow; and
classifying the first flow into one of at least two classes, based upon the first flow metric and at least a first flow metric threshold, wherein a first class of the at least two classes exceeds the at least the first flow metric threshold, and wherein a second class of the at least two classes does not exceed the at least the first flow metric threshold.

19. A non-transitory computer-readable medium storing instructions which, when executed by a processing system including at least one processor, cause the processing system to perform operations, the operations comprising:
obtaining a first sampled flow record for a first flow in a network, wherein the first sampled flow record is one of a plurality of sampled flow records for a plurality of flows in the network, wherein the first flow is one of the plurality of flows, wherein the first sampled flow record comprises information regarding selected packets of the first flow, wherein the plurality of sampled flow records is selected from a set of flow records for a set of flows in the network, wherein the set of flows includes the plurality of flows;
deriving, from the first sampled flow record, a data volume of the first flow and a duration of the first flow;
determining a first flow metric for the first flow that is calculated from a first difference between the data volume of the first flow and a weighted duration of the first flow, wherein the first flow metric is one of a plurality of flow metrics for the plurality of flows, wherein the plurality of flow metrics is determined from the plurality of sampled flow records, wherein the weighted duration of the first flow comprises a duration of the first flow modified by a weighting factor, wherein the duration of the first flow is from a beginning of the first flow to an end of the first flow; and
classifying the first flow into one of at least two classes, based upon the first flow metric and at least a first flow metric threshold, wherein a first class of the at least two classes exceeds the at least the first flow metric threshold, and wherein a second class of the at least two classes does not exceed the at least the first flow metric threshold.

20. The non-transitory computer-readable medium of claim 19, wherein the selected packets are selected from a set of packets of the first flow, and wherein each one of the selected packets is sampled from every N packets from the set of packets of the first flow, where N is a sampling factor and each packet of the set of packets is sampled with a probability 1/N independently.

* * * * *